US009162732B2

(12) United States Patent
Torres et al.

(10) Patent No.: US 9,162,732 B2
(45) Date of Patent: Oct. 20, 2015

(54) STEPPED HULL

(71) Applicant: Ram Investments of South Florida Inc., Miami, FL (US)

(72) Inventors: Ralph Torres, Miami, FL (US); Robert S Kaidy, Stuart, FL (US)

(73) Assignee: Ram Investments of South Florida Inc., Miami, FL (US)

( * ) Notice: Subject to any disclaimer, the term of this patent is extended or adjusted under 35 U.S.C. 154(b) by 79 days.

(21) Appl. No.: 14/066,279

(22) Filed: Oct. 29, 2013

(65) Prior Publication Data

US 2015/0114278 A1 Apr. 30, 2015

(51) Int. Cl.
*B63B 1/38* (2006.01)
*B63B 1/20* (2006.01)

(52) U.S. Cl.
CPC .... *B63B 1/38* (2013.01); *B63B 1/20* (2013.01)

(58) Field of Classification Search
CPC ................ B63B 1/20; B63B 1/38; B63B 1/42
USPC .................................................. 114/289–291
See application file for complete search history.

(56) References Cited

U.S. PATENT DOCUMENTS

| 1,831,339 | A | * | 11/1931 | Alanson | 114/289 |
| 3,776,168 | A | * | 12/1973 | Weeks | 114/271 |
| 4,231,314 | A | * | 11/1980 | Peters | 114/291 |
| 5,111,767 | A | * | 5/1992 | Haines | 114/288 |
| 5,452,676 | A | * | 9/1995 | Fiore | 114/291 |
| 6,216,622 | B1 | * | 4/2001 | Lindstrom et al. | 114/61.33 |
| 6,925,953 | B1 | * | 8/2005 | Batista et al. | 114/288 |
| 7,549,385 | B2 | * | 6/2009 | Hansen et al. | 114/291 |
| 8,210,116 | B2 | * | 7/2012 | Campbell et al. | 114/290 |
| 8,291,850 | B1 | * | 10/2012 | Peters | 114/289 |
| 2005/0160960 | A1 | * | 7/2005 | Batista et al. | 114/274 |
| 2007/0245944 | A1 | * | 10/2007 | Scism et al. | 114/288 |

FOREIGN PATENT DOCUMENTS

WO 9838078 A1 9/1998

* cited by examiner

*Primary Examiner* — Lars A Olson
*Assistant Examiner* — Jovon Hayes
(74) *Attorney, Agent, or Firm* — Christopher & Weisberg, P.A.

(57) ABSTRACT

An improved watercraft hull providing stability and maneuverability in turns. The hull may include a longitudinal centerline extending from bow to stern, a first and second transverse air channel that are fluidly isolated from the rest of the hull, the first and second air channels separating the hull into a bow planing portion, a middle planing portion, and a stern planing portion, a first plurality of strakes protruding from the bow planing portion, a second plurality of strakes protruding from the middle planing portion, and a third plurality of strakes protruding from the stern portion. The hull may also include a V-shaped keel portion at the bow portion centerline, and a flattened hull portion at the stern portion centerline having a deadrise angle of 0°, the flattened hull portion being disposed between and directly adjacent to two adjacent longitudinal elements of the third plurality of longitudinal elements.

20 Claims, 11 Drawing Sheets

STEPPED HULL

CROSS-REFERENCE TO RELATED APPLICATION n/a

STATEMENT REGARDING FEDERALLY SPONSORED RESEARCH OR DEVELOPMENT n/a

FIELD OF THE INVENTION

The present invention relates to a watercraft hull providing increased stability and maneuverability during turns.

BACKGROUND OF THE INVENTION

Watercraft such as high-speed powerboats typically include any of a variety of design features to improve speed, directional stability, and maneuverability. High-speed powerboats typically use dynamic lift, referred to as planing, to reduce resistance created by wave generation and to increase speed. Further, such watercraft often incorporate features to improve directional stability and control during operation.

One class of commonly used watercraft hull is the planing hull (for example, as shown in prior art FIGS. 1A and 1B), which is configured to create positive dynamic pressure so that its draft, or vertical distance to which the hull's keel extends below the waterline, decreases as the speed of the watercraft increases. In other words, a portion of the hull loses contact with the water, or lifts out of the water. The degree by which the front or fore portion of a hull lifts out the water is referred to as the trim angle. Dynamic lift reduces the wetted surface of the hull and, therefore, also reduces drag. However, planing hulls generally suffer from a resistance paradox. At speeds from a standstill to a speed about equal to 1.5 times the waterline length of the watercraft ("transition speed"), the watercraft is in "displacement mode," meaning that it has not yet reached planing speed and is displacing water as it moves forward. After reaching the transition speed, the watercraft goes into a "transition mode," in which it is no longer operating in displacement mode or planing mode. Within transition mode, the watercraft has a pronounced bow-up trim. As speed continues to increase, the watercraft moves out of the transition mode and into "planing mode," in which the trim levels out and the bow of the watercraft lowers somewhat (that is, the trim angle decreases). As the trim angle decreases, the resistance increases linearly with the dynamic pressure, which increases exponentially. This results in extremely high power requirements for very small increases in speed when trim angles are less than about 3 degrees.

Stepped planing hulls were developed to overcome this problem (for example, as shown in prior art FIG. 2). Stepped hull designs incorporate transverse discontinuities, or "steps," aft of the watercraft's center of gravity and center of pressure. These steps are generally transverse or substantially transverse (perpendicular to the watercraft's centerline), and break the one large, low-aspect-ratio planing hull into multiple high-aspect-ratio planing surfaces, thereby making the hull more efficient. Further, by providing multiple planing surfaces, the trim angle variation with speed is essentially eliminated, breaking the resistance paradox encountered with non-stepped or prismatic planing hulls. A stepped planing hull may be operated with the least drag and the optimal trim angle under all speeds. This makes the resistance increase more linearly with speed, rather than exponentially, and enables the boat to reach much higher speeds, or operate at higher efficiencies than the non-stepped planing hull.

However, the steps of a stepped hull cause a reduction in the wetted area of the hull at high speeds. Although this is favorable for speed and efficiency, it can adversely affect the directional stability and maneuverability of the watercraft. The more the wetted area of the hull is reduced, the more susceptible the watercraft becomes to yawing or uncontrolled turning at high speeds. In order to reintroduce yaw stability, some stepped hull watercraft include features such as strakes and pads, but these have largely been ineffective.

Other stepped hull watercraft include transverse air channels incorporated into the steps, which introduce air to the stern, thereby making the watercraft faster and more efficient than a non-stepped hull (for example, as shown in prior art FIG. 3). In some stepped hulls, air is sucked into the transverse cavities, from where it flows into the stern portion of the boat, toward the transom. The air beneath the stern also creates lift and reduces friction between the hull and the water. Essentially, a portion of the stern rides on a cushion of air. The reduction in wetted hull surface area and the resulting reduction in friction mean that the watercraft moves more easily in the water, thereby improving efficiency of the craft. However, this also means that the stern portion of the hull becomes "slippery," which can lead to handling, stability, and maneuverability difficulties. Further, although stepped hull designs that incorporate air channels that allow for longitudinal air flow may improve efficiency, the resulting air on the stern channels may introduce air into the water flow at the propeller and thereby reduce propeller performance and decrease propulsive efficiency, thereby offsetting gains in overall efficiency.

It is therefore desirable to provide an improved stepped hull design that increases stability and maneuverability of a watercraft, while maintaining propeller performance and propulsive efficiency.

SUMMARY OF THE INVENTION

The present invention advantageously provides an improved hull and method for providing increased stability and maneuverability to a watercraft hull. In one embodiment, the watercraft hull may include a bow portion, a stern portion, and a longitudinal centerline therebetween, a plurality of longitudinal elements protruding from the hull, a flattened hull portion at the centerline in the stern portion having a deadrise angle of 0°, and a first keel ridge portion at the centerline in the bow portion having a deadrise angle greater than 0°. The plurality of longitudinal elements may include a first pair of longitudinal elements, a second pair of longitudinal elements, and a third pair of longitudinal elements, the first pair being closest to the centerline. The flattened hull portion may be disposed between the first pair of longitudinal elements. Further, the hull may include a middle portion disposed between the bow portion and the stern portion, a first air channel having a first inlet and a second inlet, the first air channel being transverse to the centerline, and a second air channel having a third inlet and a fourth inlet, the second air channel being transverse to the centerline. The first air channel may be in fluid communication only with the first and second inlets, and the second air channel being in fluid communication only with the third and fourth inlets. The first and second air channels may be fluidly isolated from the rest of the hull. The watercraft hull may further include a second keel ridge portion at the centerline in the middle portion having a deadrise angle of 0°, and the second keel ridge portion at the centerline in the middle portion may have a deadrise angle of 0°. The first and second air channels may divide the hull into a first planing portion in the bow portion, a second planing portion in the middle portion, and a third planing portion in the stern portion. The first planing portion may include a first set of protruding longitudinal elements, the second planing portion may include a second set of protruding longitudinal elements, and the third planing portion may include a third set of protruding longitudinal elements. Further, each of the first, second, and third sets of longitudinal elements may include an inner pair of longitudinal elements, a middle pair of longitudinal elements, and an outer pair of longitudinal elements. The inner pair of longitudinal elements in the third set of longitudinal elements may be closer to the centerline than the inner pair of longitudinal elements in the first and second sets of longitudinal elements. The first keel ridge portion may be disposed between the inner pair of the first set of longitudinal elements, the second keel ridge portion may be disposed between the inner pair of the second set of longitudinal elements, and the flattened hull portion may be defined by the second air channel on a first side and the inner pair of the first set of longitudinal elements on a second and third side. The watercraft may further include a first port deadrise hull portion, a first starboard deadrise hull portion, a second port deadrise hull portion and a second starboard deadrise hull portion, a third port deadrise hull portion, and a third starboard deadrise hull portion, each having a deadrise angle greater that 0°. Additionally, the first keel ridge portion, the first port deadrise portion, and the first starboard deadrise portion may be disposed between the inner pair of first set of longitudinal elements, the second keel ridge portion, the second port deadrise portion, and the second starboard portion may be disposed between the inner pair of second set of longitudinal elements, and the flattened hull portion may be disposed between and directly adjacent to the inner pair of third set of longitudinal elements. Each longitudinal element may include a first lateral surface, a second lateral surface, and a face, and the face may have a 0° deadrise, and the first and second lateral surfaces may be substantially orthogonal to the face. The watercraft hull may further include a port sidewall and a starboard sidewall, wherein each of the first, second, and third sets of longitudinal elements include a port outermost longitudinal element and a starboard outermost longitudinal element, and the port sidewall may define the first face of the port outermost longitudinal element and the starboard sidewall may define the second face of the starboard outermost longitudinal element.

In another embodiment, the watercraft hull may include a bow, a stern, and a longitudinal centerline extending therethrough; a first transverse air channel and a second transverse air channel, the first and second air channels separating the hull into a bow planing portion, a middle planing portion, and a stern planing portion; a first plurality of longitudinal elements protruding from the bow planing portion, a second plurality of longitudinal elements protruding from the middle planing portion, and a third plurality of longitudinal elements protruding from the stern portion; a first port deadrise hull portion, a first starboard deadrise hull portion, a second port deadrise hull portion and a second starboard deadrise hull portion, a third port deadrise hull portion, and a third starboard deadrise hull portion, each having a deadrise angle greater that 0°; a V-shaped keel portion at the centerline in the bow portion having a deadrise angle greater than 0°, the V-shaped keel portion, the first port deadrise portion, and the first starboard deadrise portion being disposed between two adjacent longitudinal elements of the first plurality of longitudinal elements; a flattened keel portion at the centerline in the middle portion having a deadrise angle of 0°, the flattened keel portion, the second port deadrise portion, and the second starboard deadrise portion being disposed between two adjacent longitudinal elements of the second plurality of longitudinal elements; and a flattened hull portion at the centerline in the stern portion having a deadrise angle of 0°, the flattened hull portion being disposed between an directly adjacent to two adjacent longitudinal elements of the third plurality of longitudinal elements. The first and second transverse air channels may be fluidly isolated from the rest of the hull.

The method may include providing a watercraft including a hull having a longitudinal centerline; a first air channel transverse to the centerline and a second air channel transverse to the centerline, the first and second air channels separating the hull into a bow portion, a middle portion, and a stern portion, and the first and second air channels being in fluid communication with atmospheric air; a first plurality of strakes protruding from the bow portion, a second plurality of strakes protruding from the middle portion, and a third plurality of strakes protruding from the stern portion, each of the first, second, and third pluralities of strakes having a port side innermost strake and a starboard side innermost strake; and a V-shaped keel portion in the bow portion, a flattened keel portion in the middle portion, and a flattened hull portion in the stern portion, the flattened hull portion having a deadrise of 0° and being directly adjacent to the port and starboard innermost strake of the third plurality of strakes; moving the watercraft in a first direction to create a vacuum within the first and second air channels, the vacuum drawing atmospheric air into the first and second air channels; and retaining a volume of atmospheric air within the first and second air channels during movement of the watercraft in the first direction. Each strake may include a first lateral surface, a second lateral surface, and a face, and the face may have a deadrise of 0°. The method may further comprise turning the watercraft in a second direction; and generating transverse pressure on at least one of the first and second lateral surface of each strake.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein.

DETAILED DESCRIPTION OF THE INVENTION

Figure 1A:
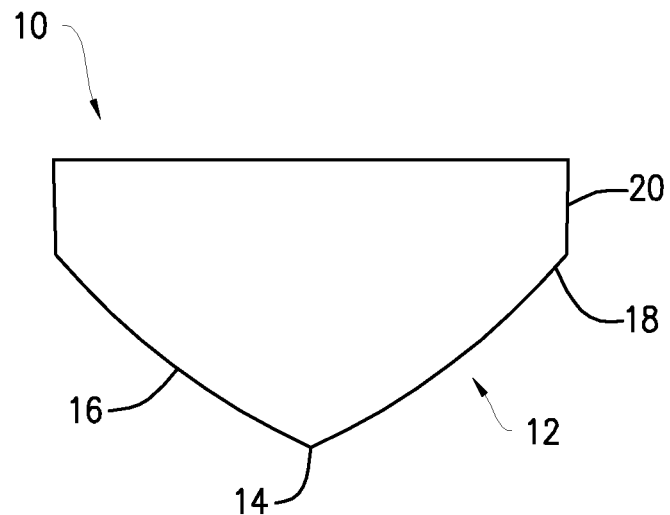
FIG. 1A shows a cross-sectional view of a stylized representation of a planing hull as is currently known in the art.
Figure 1B:
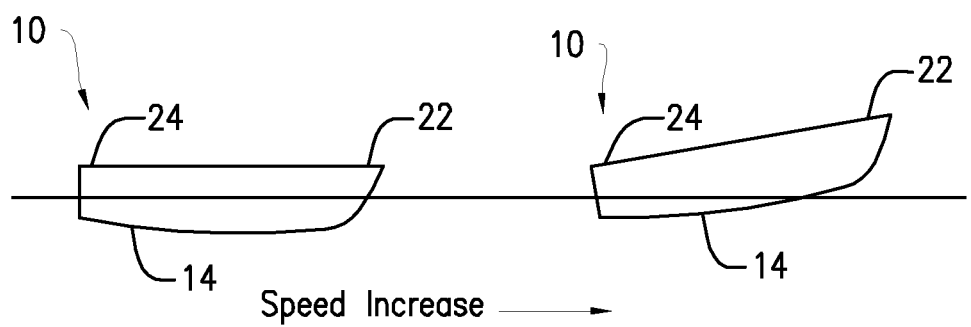
FIG. 1B shows a stylized representation of a planing hull partially lifting out of the water as speed increases.
Figure 2:
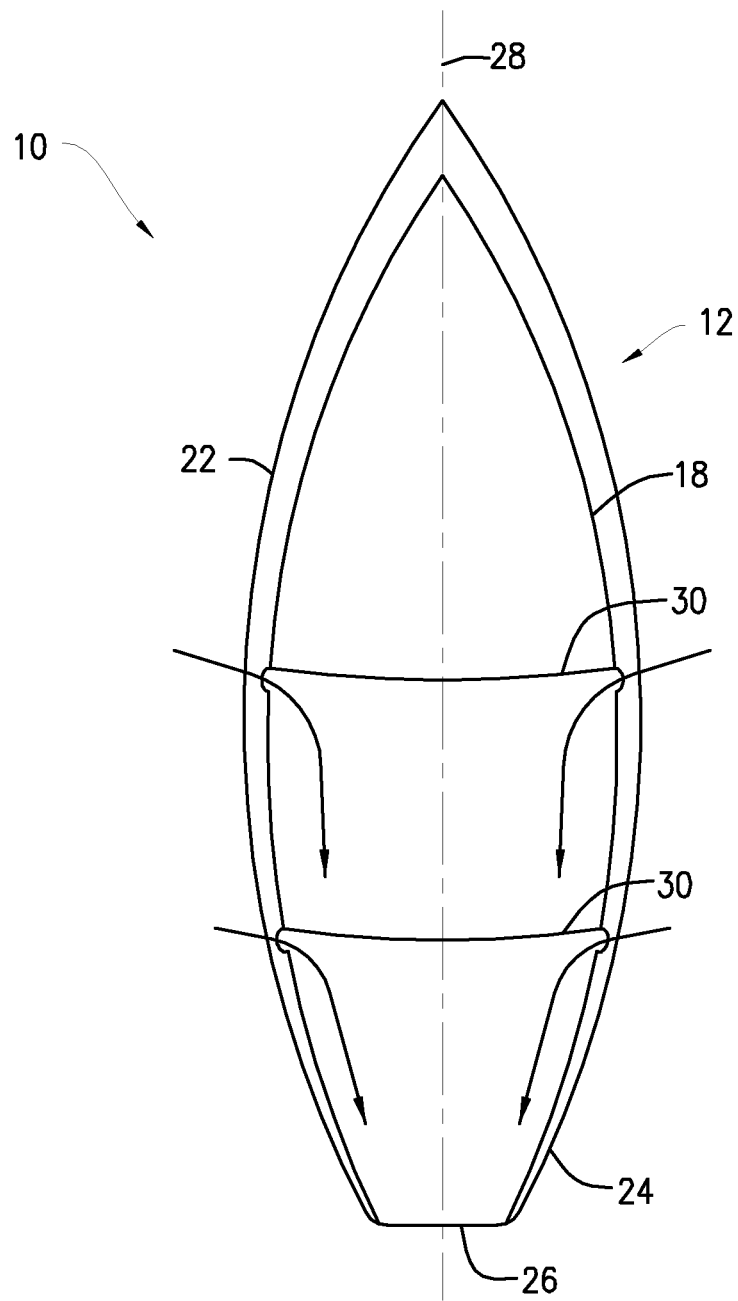
FIG. 2 shows a perspective view of a stylized representation of a stepped hull as is currently known in the art.
Figure 3:
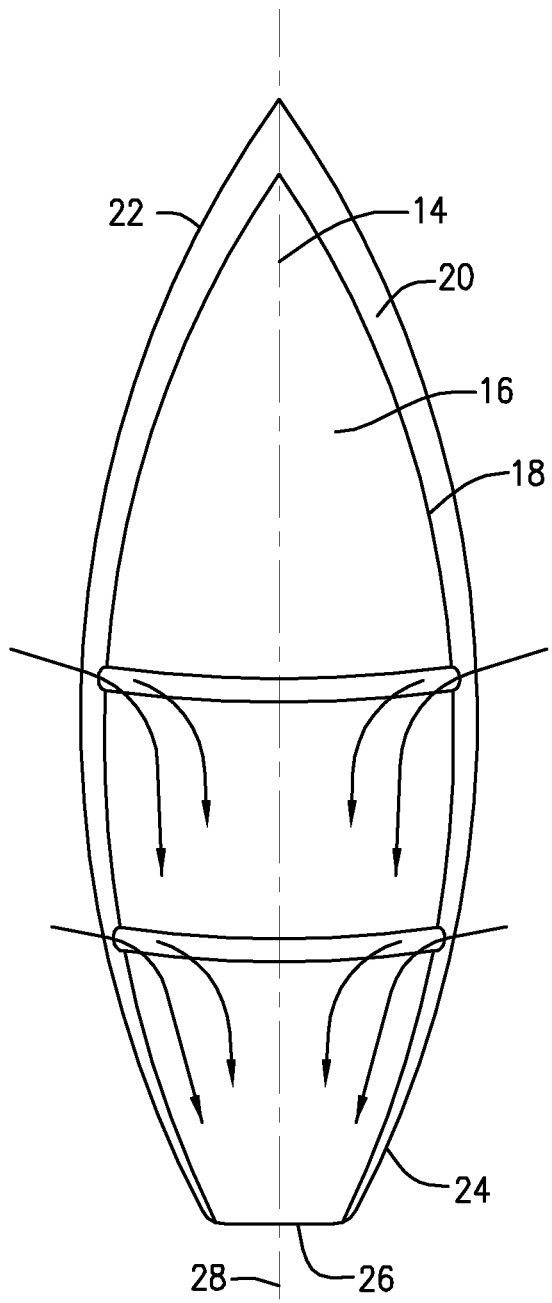
FIG. 3 shows a perspective view of a stylized representation of a stepped hull having air channels as is currently known in the art.

Referring now to FIGS. 1-3, stylized representations of a prismatic planing hull, a stepped planing hull, and a stepped planing hull including air channels, as currently known in the art, are shown. These hulls are discussed in the Background section above. Each of the hulls 10 in FIGS. 1-3 generally includes a hull bottom 12 that includes a keel 14, a deadrise 16 on either side of the keel 14, a chine 18 at the interface between the deadrise 16 and a sidewall 20, a bow portion 22, a stern portion 24, a transom 26 in the stern portion, and a centerline 28 running between the bow portion 22 and the stern portion 24. The stepped hulls 10 shown in FIGS. 2 and 3 also include one or more steps 30, the hull 10 of FIG. 3 further including one or more air channels 32. Air movement through commonly known stepped hulls is depicted using arrows in FIGS. 2 and 3. As shown in FIGS. 2 and 3, a volume of air may enter into the steps 30 and/or air channels 32 and then flow longitudinally along the stern portion 24 of hull bottom 12 toward the transom 26.

As used herein, the term "substantially" may include a tolerance of 10% or less. For example, a line that is "substantially parallel" to another may be offset from an absolutely parallel line by 10° or less.

Figure 4:
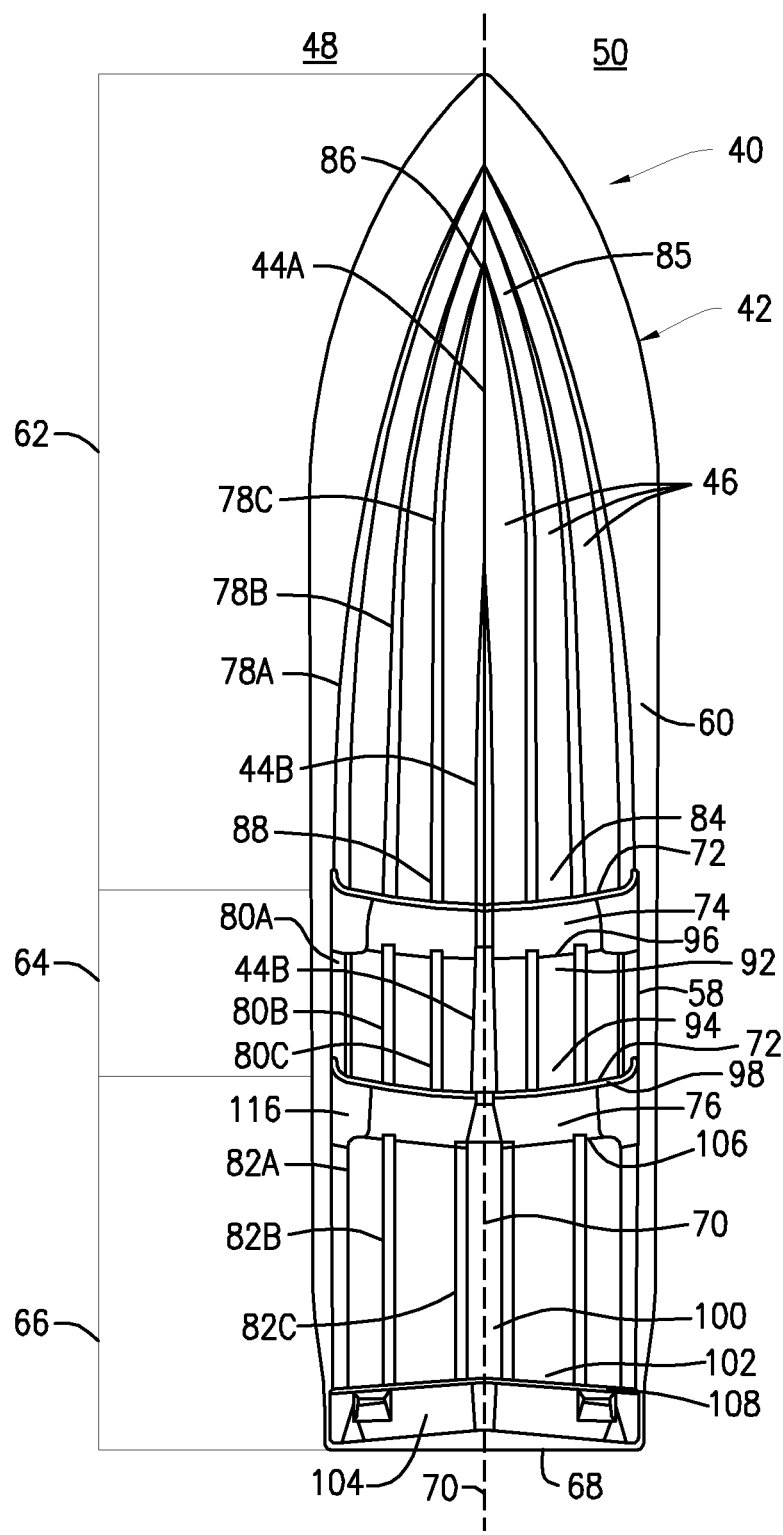
FIG. 4 shows a bottom view of an improved stepped hull in accordance with the present invention.

Referring now to FIG. 4-11, an improved stepped hull in accordance with the present invention is shown. The hull 40 may be part of a speedboat, a fishing boat, or any other suitable watercraft (also referred to as a "boat" or "vessel"). The hull 40 of FIGS. 4-11 may generally include a hull bottom 42, which may include a keel 44, a deadrise portion 46 on either side, that is, port 48 and starboard 50 (as viewed from below the hull 40, as shown in FIG. 4), of the keel 44, one or more chines 58 at the intersection of the deadrise portions 46 and the sidewalls 60, a bow portion 62, a middle portion 64, a stern portion 66, and a transom 68 in the stern portion 66. The hull 40 may also include a centerline 70 that runs along the hull's longitudinal axis from the bow portion 62 to the stern portion 66. The hull 40 of FIGS. 4-11 may also include one or more steps 72 and one or more air channels 74, 76 integrated into the one or more steps 72, and a plurality of strakes 78, 80, 82 that protrude from the hull bottom 42. The deadrise portion 46 on either side of the centerline 70 may be interrupted by the plurality of protruding strakes 78, 80, 82, such that a longitudinal portion of deadrise hull 46 is disposed between each set of adjacent strakes 78, 80, 82.

Figure 7:
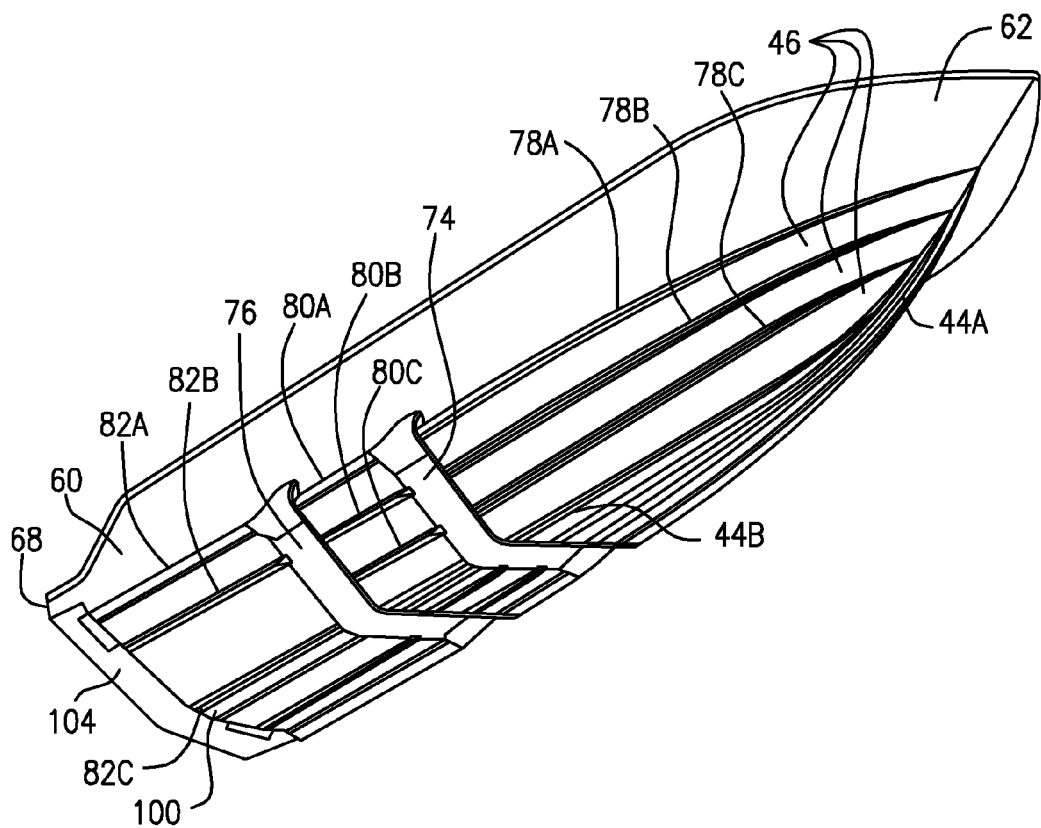
FIG. 7 shows a perspective view of an improved stepped hull in accordance with the present invention.
Figure 9:
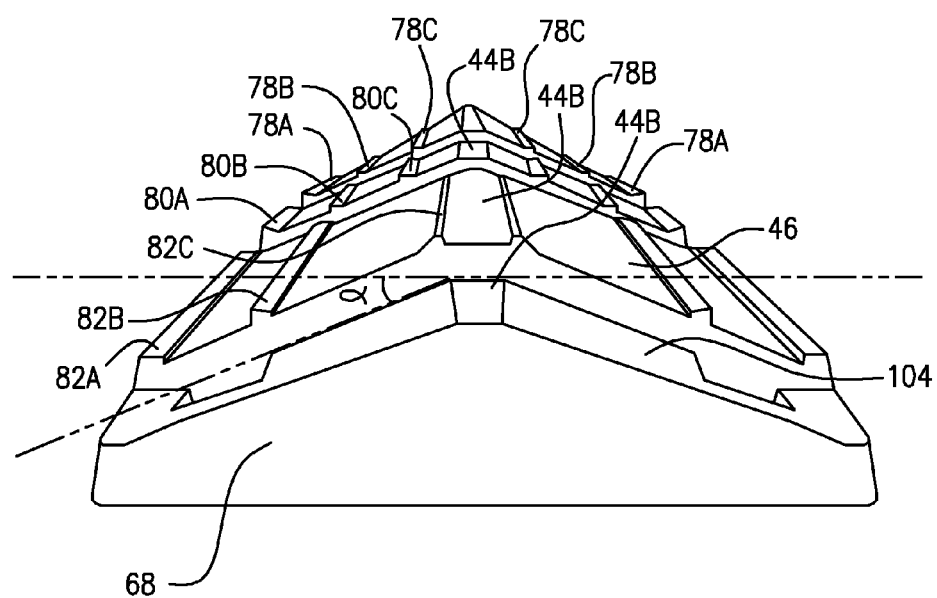
FIG. 9 shows a rear view of an improved stepped hull in accordance with the present invention.

The bow portion 62 of the hull 40 may include a V-shaped keel 44A that gradually transitions to a flattened keel 44B within the aft portion 84 of the bow portion 62, just forward of a first transverse air channel 74 (for example, as shown in FIGS. 4, 7, and 9). At least at the fore portion 85 of the bow portion 62, the V-shaped keel 44A may take on the shape of the deadrise portion 46 on either side, thus giving the keel portion 44A a deadrise angle that is greater than 0°. That is, the deadrise portions 46 may slope inward toward the centerline 70 at meet at an acute angle, forming the V-shaped keel portion 44A. As the keel 44 transitions from the fore portion 85 to the aft portion 84 of the bow portion 62, the deadrise portions 46 terminate at a flattened keel portion 44B of increasing width, the flattened keel 44B itself having a deadrise angle of 0°. The term "deadrise" may refer to the angle that is formed between an imaginary horizontal line and the hull at any given point. So, the flattened keel 44B having a deadrise of 0° may mean that the flattened portion is horizontal without any angle of separation from the horizontal line. The adjacent deadrise portions 46 of the hull bottom 42, on the other hand, are separated from the horizontal line by an angle $\alpha$ that is greater than 0° (for example, as shown in FIG. 9). Further, the angle $\alpha$ of the deadrise portions 46 from horizontal may be discontinuous, that is, change at one or more locations, along the length of the hull 40.

The bow portion 62 may further include a plurality of longitudinal strakes 78 protruding from the deadrise portion 46 of the hull bottom 44, each having a first end 86 and a second end 88. As a non-limiting example, six strakes 78A, 78B, 78C are shown in FIGS. 4-11. The keel 44 may be disposed between the two innermost strakes 78A. Each of the outermost strakes 78C may define the chine 58 between the deadrise portions 46 and the sidewalls 60. The first end 86 of each strake 78 may be located at or in contact with the keel 44A in the fore portion 85 of the bow portion 62, and the second end 88 of each strake 78 may terminate at the first transverse air channel 72. As shown, for example, in FIG. 4, the longitudinal strakes 78 may be generally parallel to the centerline 70 of the hull 40, except for the slight curvature required for the first end 86 of each strake 78 to meet the keel 44. Further, each strake 78 may be tapered from the second end 88 to the first end 86.

The middle portion 64 of the hull 40 may include a flattened keel 44B having a width that increases from the fore portion 92 to the aft portion 94 of the middle portion 64. The flattened keel 44B may have a deadrise angle of 0°. As a non-limiting example, the width of the flattened keel 44B at the aft portion 94 of the middle portion 64 may be between approximately 2% and approximately 25% greater than the width of the flattened keel 44B at the fore portion 92 of the middle portion 64. Like the bow portion 62, the middle portion 64 of the hull 40 may include a plurality of strakes 80 protruding from the deadrise portion 46 of the hull bottom 44. As a non-limiting example, six strakes 80 are shown in FIGS. 4-11. The keel 44 and a deadrise portion 46 on either side of the keel 44 may be disposed between the two innermost strakes 80, forming a keel ridge 95 between the two innermost strakes 80. Each of the outermost strakes 80 may define the chine 58 between the deadrise portions 46 and the sidewalls 60. The first end 96 of each strake 80 may be located just aftward of the first transverse air channel 74 and the second end 98 of each strake 80 may be located just forward of the second transverse air channel 76. The first end 96 of each strake 80 may be gradually tapered or flattened to meet the rear edge of the first transverse air channel 74, which may reduce the resistance of the first end 96 as it hits the oncoming water. Each strake 80 may be parallel to the centerline 70 of the hull 40. Unlike the bow portion 62, the strakes 80 of the middle portion 64 may not have a tapered shape, and the width of each strake may be continuous from the first end 96 to the second end 98, and may be the same or substantially the same as the width of the second end 88 of the corresponding bow portion strake 78.

Unlike the bow 62 and middle 64 portions of the hull 40, the stern portion 66 may not include a keel ridge 95 between the two innermost strakes 82. Instead, the stern portion 66 may include a longitudinal flattened area 100 disposed between the two innermost strakes 82A. As shown, for example, in FIGS. 1 and 8, the boundaries of the longitudinal flattened area 100 are defined by the two innermost strakes 82, the second transverse air channel 76, and a ledge 102 in the stern portion 66.

The strakes 82 of the stern portion 66 may protrude from the deadrise portion 46 of the hull bottom 44. Further, the two innermost strakes 82A may be offset toward the centerline 70 from the two innermost strakes 78, 80 of the bow portion 62 and the middle portion 64, respectively. The ledge 102 may lead to a recessed area 104 in the stern portion 66 adjacent to the transom 68. As a non-limiting example, six strakes 82 are shown in FIGS. 4-11. The outermost strakes 82C may define the chine 58 between the deadrise portions 46 and the sidewalls 60. The first end 106 of each strake 82 may be located just aftward of the second transverse air channel 76 and the second end 108 of each strake 82 may be located just forward of the ledge 102. The first end 106 of each strake 82 may be gradually tapered or flattened to meet the rear edge of the second transverse air channel 76, which may reduce the resistance of the first end 106 as it hits the oncoming water. Each strake 82 may be parallel to the centerline 70 of the hull 40. Like the middle portion 64, the strakes 82 of the stern portion 66 may not have a tapered shape, and the width of each strake 82 may be continuous from the first end 106 to the second end 108, and may be the same or substantially the same as the width of the second end 98 of the corresponding middle portion strake 80. The recessed area 104 of the stern portion 66 may not include any strakes but may include a flattened keel ridge 95.

Figure 8A:
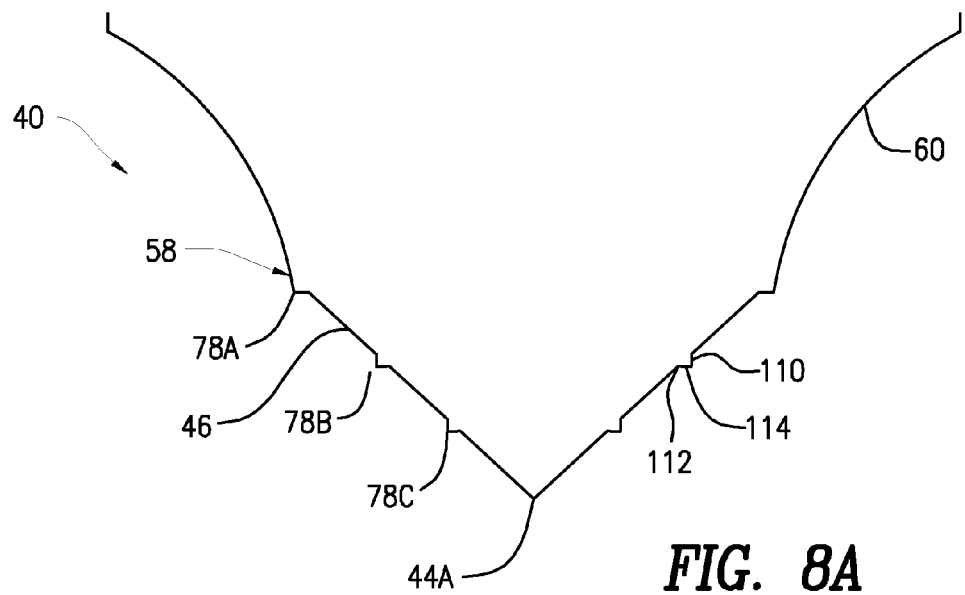
FIG. 8A shows a cross-sectional view the bow portion of an improved stepped hull in accordance with the present invention.
Figure 8B:
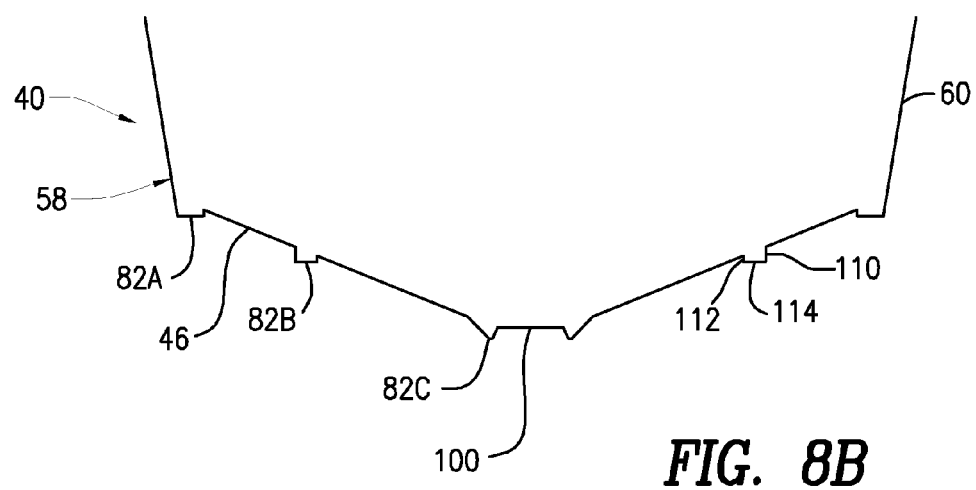
FIG. 8B shows a cross-sectional view the stern portion of an improved stepped hull in accordance with the present invention.

As is best seen in FIGS. 8A and 8B, each strake 82 in the stern portion 66 may define an outer lateral surface 110, an inner lateral surface 112, and a face 114. The terms "outer" and "inner" may be used with reference to the centerline 70, with the inner lateral surface 112 of each strake 82 being closest to the centerline 70. In the two outermost strakes 82C, the outer lateral surface 112A may be integrated with at least a portion of the sidewall 60. Explained in another way, the sidewalls 60 of the hull 40 may define at least a portion of the outer lateral surface 112A of each of the outermost strakes 82C.

The face 114 of each strake 82 in the stern 66 portion of the hull 40 may be parallel or substantially parallel to, although not coplanar with, the flattened keel 44B. In other words, the face 114 of each strake 80, 82 may have a 0° deadrise. The outer 110 and inner 112 lateral surfaces of these strakes 80, 82 may be substantially orthogonal to the face 114. That is, the outer 110 and inner 112 lateral surfaces may meet the face 114 at an angle that is 85° (±10°). The angle at which the outer 110 or inner 112 lateral surface meets the deadrise portion 46 of the hull bottom 44 may depend on the deadrise angle of the hull bottom 44 at the meeting point. Generally, the term "deadrise angle" may refer to the angle formed between horizontal and the hull at any given point.

Each strake 78, 80 in the bow portion 62 and the middle portion 64 may define an outer lateral surface 110 and a face 114 that connects to the deadrise portion 46 without defining a face 114 that has a 0° deadrise and an inner lateral surface that is substantially orthogonal to the face. Instead, the face 114 of the strakes 78, 80 may itself have deadrise angle that is in the opposite direction to the deadrise 46 of the hull bottom 42. Optionally, there may be a slight depression between the face 114 and the deadrise 46, which could be considered to be an inner surface 112. Alternatively, the strakes 78, 80 may be configured similar to the strakes 82 in the stern portion 66 of the hull. In either configuration, the face 114 of each strake 78 in the bow portion 62 of the hull 40 may be tapered from the second end 88 to the first end 86 of the strake 78. So, from the first end 86 of the strake to a distance aftward from the first end 86, the strake may include a sharp ridge and not a planar face.

Figure 5:
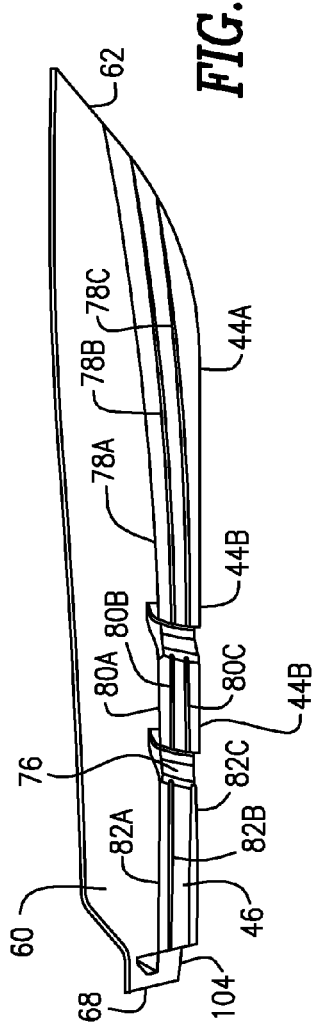
FIG. 5 shows a side view of an improved stepped hull in accordance with the present invention.

Continuing to refer to FIGS. 4-11, the hull 40 may include a first transverse air channel 74 and a second transverse air channel 76, each being incorporated into a step 72. Each air channel 74, 76 may extend from the port-side chine 58 to the starboard-side chine 58, and may include an air inlet 116 on either end (for example, as shown in FIG. 5). Although referred to as "transverse" steps 72 and air channels 74, 76, this term may be used in the sense that the steps 72 and air channels 74, 76 transverse the centerline 70 of the hull 40. However, it will be understood that these features may not be entirely orthogonal to the centerline 70, and may instead be slightly V-shaped, with either side of the centerline being directed aftward, forward, or having another configuration for optimizing air intake and retention. The air channels 74, 76 may divide the hull bottom 42 into three planing surfaces, one being in the bow portion 62, a second being in the middle portion 64, and a third being in the stern portion 66.

Figure 6:
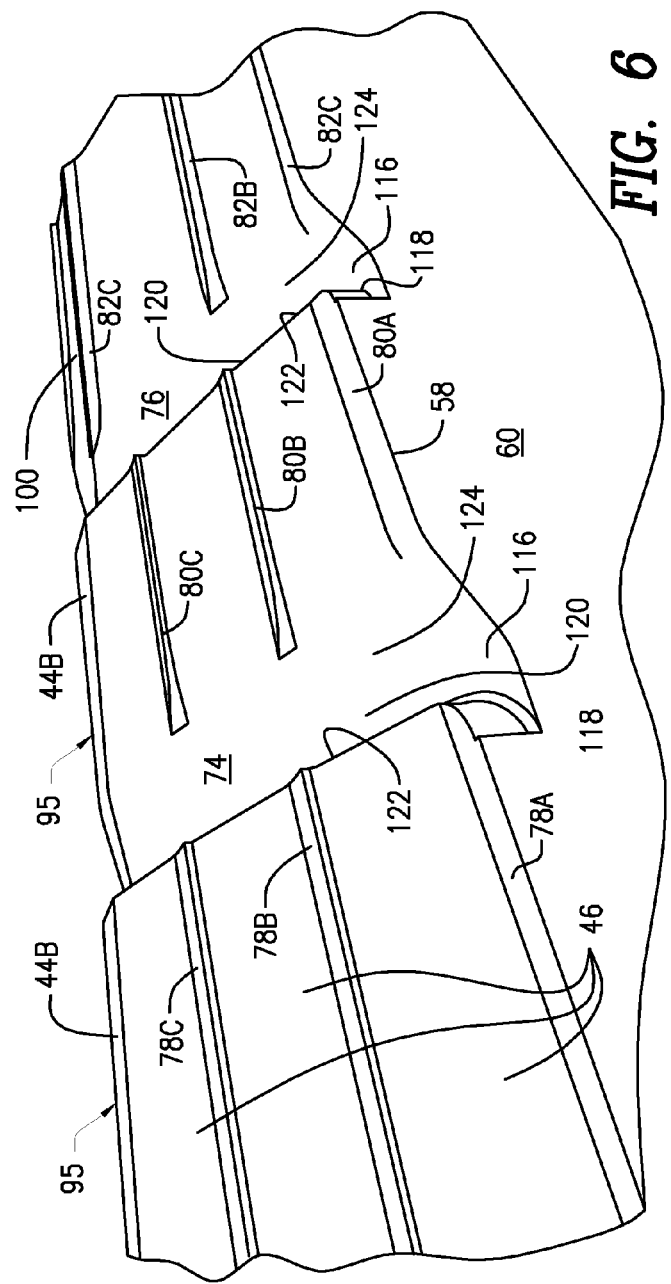
FIG. 6 shows a stylized representation of a cross-sectional view of an air channel.

As shown in the cross-sectional view of FIG. 6, each air channel may be a recessed area within the hull bottom 44 that is defined by a ceiling 120, fore wall 122, and an aft wall 124. The fore 122 and aft 124 walls may be orthogonal to or substantially orthogonal to the ceiling 120. That is, the fore 122 and aft 124 walls may meet the ceiling 120 at angles that are within 85°±10°. Alternatively, the fore 122 and/or aft wall 124 may each meet the ceiling 120 at any angle that defines an air channel that effectively traps atmospheric air within and prevents the trapped air from flowing longitudinally over the hull bottom 44 from the air channel 74, 76 toward the transom (i.e. sternward). Each air inlet 116 may include a flow separator 118, the configuration of which causes water on the sidewalls 60 of the watercraft adjacent to the inlet 116 to flow away from the hull 40. This may reduce the amount of water that flows into each air channel 74, 76 and may help retain the atmospheric air within the channel 74, 76. Preventing water from entering the air channels 74, 76, and resulting wetting of the channel 74, 76, may prevent an increase in resistance and, therefore, reduction in efficiency.

Figure 10:
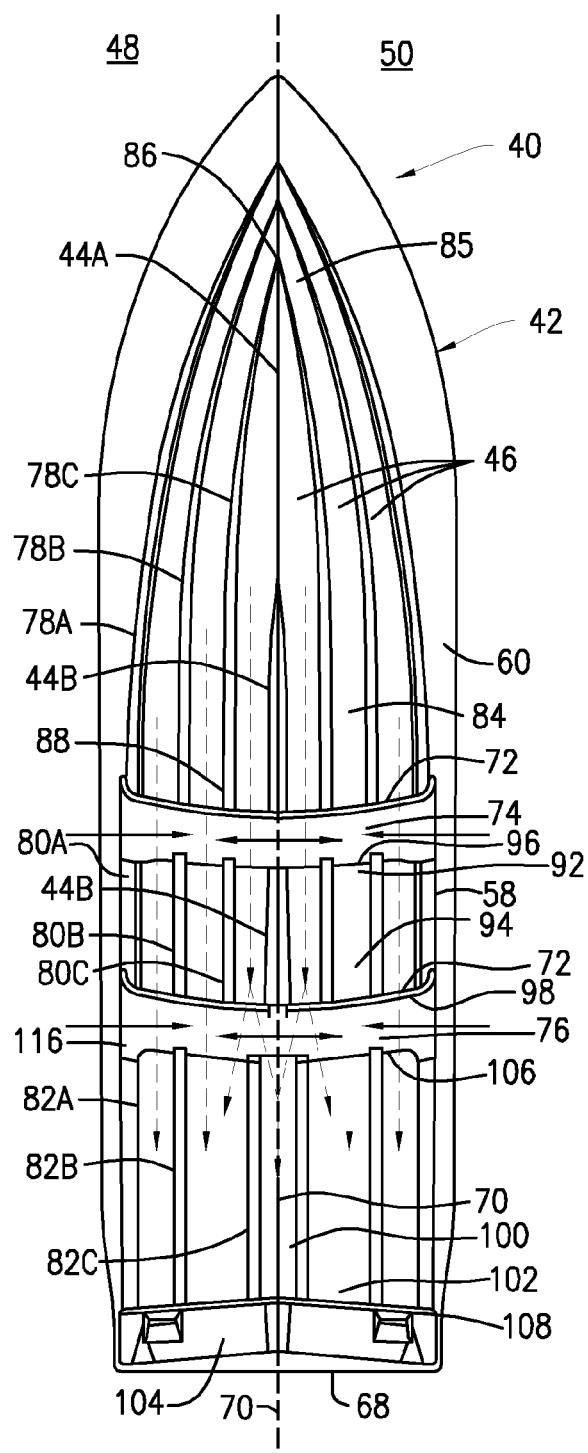
FIG. 10 shows a bottom view of a stylized representation of the bottom of an improved stepped hull in accordance with the present invention, showing the flow of air and water over the hull bottom.

Referring particularly now to FIG. 10, a bottom view of a stylized representation of the bottom of the improved stepped hull is shown, with the flow of air and water over the hull bottom being depicted by arrows. As the watercraft moves forward initially from a stop, a slight vacuum is created in the air channels, which causes atmospheric air to be sucked into the air channels 74, 76 through the air channel inlets 116. This air is then retained within the air channels 74, 76 as the boat's speed increases, the configuration of which channels 74, 76 prevents the air from flowing longitudinally along the hull bottom 44 toward the transom 68. The air within the air channels 74, 76 is shown in solid arrows in FIG. 10. Likewise, the flow of water over the retained air within the air channels 74, 76 and the hull bottom 44 is shown in dashed arrows in FIG. 10. The flow of water may be directed between the longitudinal protruding strakes 78, 80, 82, which may increase efficiency.

Figure 11:
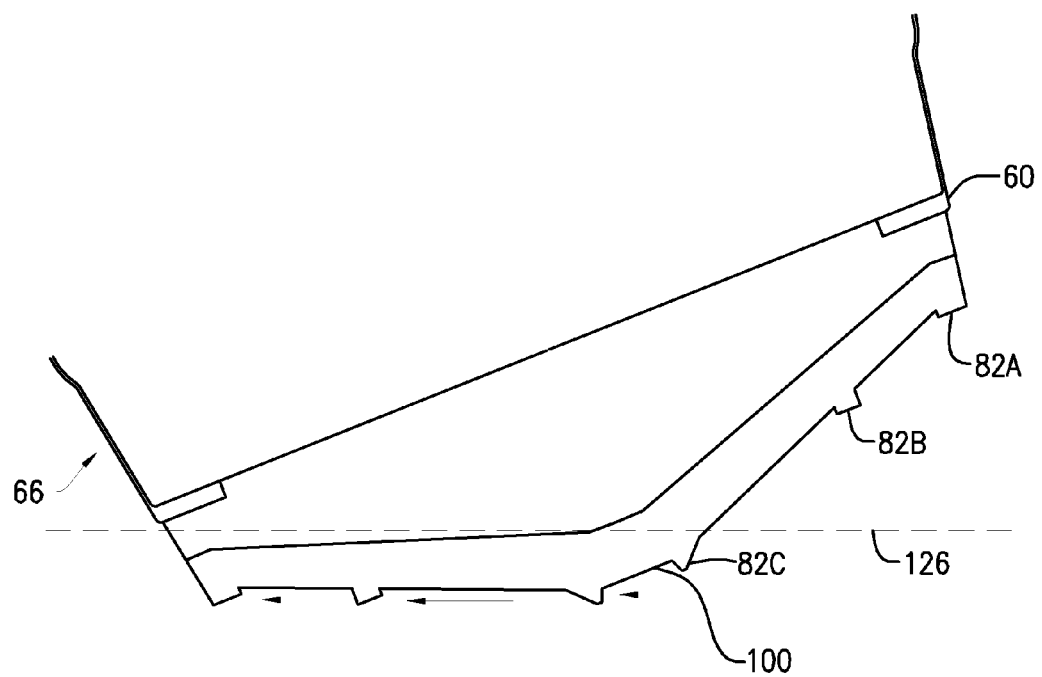
FIG. 11 shows a cross-sectional view of the stern portion of an improved stepped hull during a turning maneuver.

Referring now to FIG. 11, a cross-sectional view of the stern portion of an improved stepped hull is shown during a turning maneuver. During a turn, the strakes 78, 80, 82 (strakes 80 are shown in FIG. 11) generate high pressure transversely to the fore-and-aft line of the watercraft (that is, athwartships) to resist yawing and side velocity, holding the stern portion 66 of the watercraft in the turn and preventing the watercraft from spinning about its center point during a turn. An exemplary water line 126 is shown in dashed lines for reference.

Figure 12:
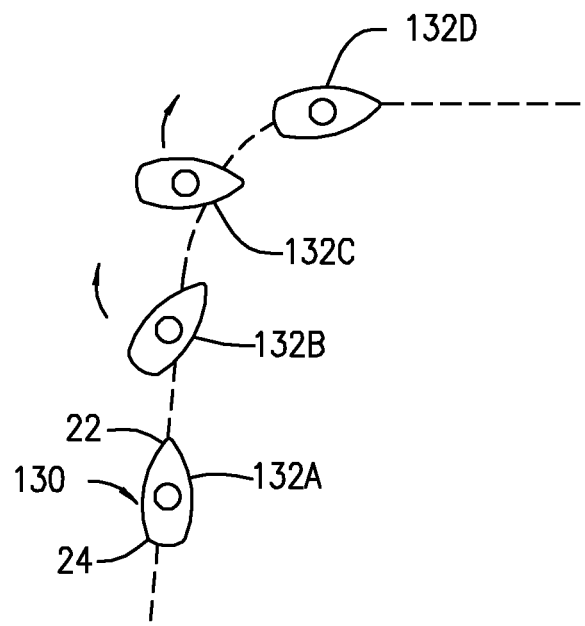
FIG. 12 shows an overhead stylized representation of a stepped hull watercraft known in the art during a turning maneuver.
Figure 13:
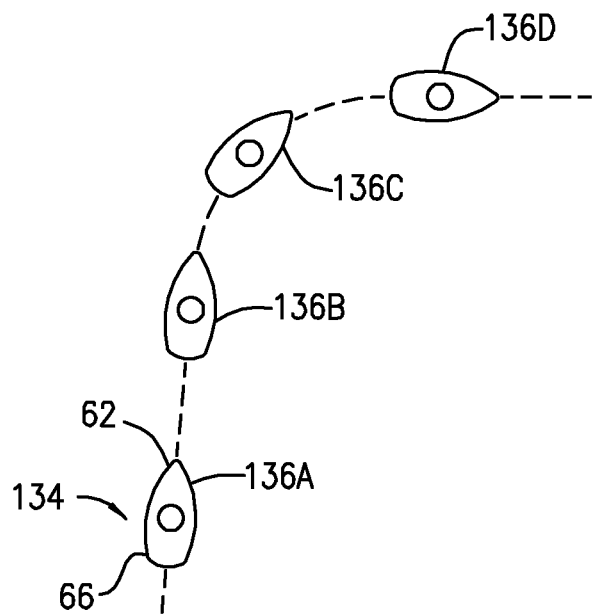
FIG. 13 shows an overhead stylized representation of an improved stepped hull in accordance with the present invention during a turning maneuver.

Referring now to FIGS. 12 and 13, a watercraft having a stepped hull 130 known in the art and the improved stepped hull in accordance with the present invention are each shown during a turning maneuver. Positions 130A, 130B, 130C, 130D are stylized representations of the watercraft in various positions when effectuating, for example, an approximately 90° turn. Stepped hulls known in the art may be designed to allow air from the steps 30 and/or air channels 32 to flow aftward, that is, toward the transom 26. This air may create lift and reduce the friction between the hull and the water. Although this reduction in wetted hull surface may make the watercraft faster and more efficient, it may also cause the stern portion 66 to become "slippery," which can lead to handling, stability, and maneuverability difficulties. Essentially, the stern portion 66 of the watercraft may slide across the water in a wider arc than the bow portion 64, as shown in FIG. 12.

In contrast, a watercraft having an improved stepped hull design 134 may follow the turn without the stern portion 66 sliding out from the bow portion 64. Positions 136A, 136B, 136C, 136D are stylized representations of the watercraft in various positions when effectuating, for example, an approximately 90° turn. Unlike the stepped hull of the prior art, the portions of the improved stepped hull bottom 44 between the transverse air channels 74, 76 remain in contact with the water, preventing uncontrolled sideways movement of the stern portion 66. This may be best shown in the comparison between the hull position of FIGS. 12 and 13. In FIG. 12, the stern portion 66 of the watercraft 130 in positions 132B and 132C is not tracking the bow portion 64 along the turn. Rather, the stern portion 66 is sliding out from the bow portion 64. In contrast, the stern portion 66 of the watercraft 134 in positions 136B and 136C in FIG. 13 follows the bow portion 64 through the turn.

It will be appreciated by persons skilled in the art that the present invention is not limited to what has been particularly shown and described herein above. In addition, unless mention was made above to the contrary, it should be noted that all of the accompanying drawings are not to scale. A variety of modifications and variations are possible in light of the above teachings without departing from the scope and spirit of the invention, which is limited only by the following claims.

What is claimed is:

1. A watercraft hull comprising:
   a bow portion, a stern portion, and a longitudinal centerline therebetween;
   a plurality of longitudinal elements protruding from the hull;
   a flattened hull portion at the centerline in the stern portion having a deadrise angle of 0°, the flattened hull portion being between and immediately adjacent to two of the plurality of longitudinal elements; and
   a first keel ridge portion at the centerline in the bow portion having a deadrise angle greater than 0°.

2. The watercraft hull of claim 1, wherein the plurality of longitudinal elements includes a first pair of longitudinal elements, a second pair of longitudinal elements, and a third pair of longitudinal elements, the first pair being closest to the centerline.

3. The watercraft hull of claim 2, wherein the flattened hull portion is disposed between the first pair of longitudinal elements.

4. The watercraft hull of claim 2, further comprising:
   a middle portion disposed between the bow portion and the stern portion;
   a first air channel having a first inlet and a second inlet, the first air channel being transverse to the centerline; and
   a second air channel having a third inlet and a fourth inlet, the second air channel being transverse to the centerline, the first air channel being in fluid communication only with the first and second inlets, and the second air channel being in fluid communication only with the third and fourth inlets.

5. The watercraft hull of claim 2, wherein the first and second air channels are each configured to be fluidly isolated from the rest of the hull when the hull moves in a forward direction in water.

6. The watercraft hull of claim 4, further including a second keel ridge portion at the centerline in the middle portion having a deadrise angle of 0°.

7. The watercraft hull of claim 6, wherein the second keel ridge portion includes a first end and a second end, a width of the first end being less than a width of the second end.

8. The watercraft hull of claim 6, wherein the first and second air channels divide the hull into a first planing portion in the bow portion, a second planing portion in the middle portion, and a third planing portion in the stern portion.

9. The watercraft hull of claim 8, wherein the first planing portion includes a first set of protruding longitudinal elements, the second planing portion includes a second set of protruding longitudinal elements, and the third planing portion includes a third set of protruding longitudinal elements.

10. The watercraft hull of claim 9, wherein each of the first, second, and third sets of longitudinal elements includes an inner pair of longitudinal elements, a middle pair of longitudinal elements, and an outer pair of longitudinal elements.

11. The watercraft hull of claim 10, wherein the inner pair of longitudinal elements in the third set of longitudinal elements are closer to the centerline than the inner pair of longitudinal elements in the first and second sets of longitudinal elements.

12. The watercraft hull of claim 10, wherein the first keel ridge portion is disposed between the inner pair of the first set of longitudinal elements, the second keel ridge portion is disposed between the inner pair of the second set of longitudinal elements, and the flattened hull portion is defined by the second air channel on a first side and the inner pair of the first set of longitudinal elements on a second and third side.

13. The watercraft hull of claim 12, further comprising a first port deadrise hull portion, a first starboard deadrise hull portion, a second port deadrise hull portion and a second starboard deadrise hull portion, a third port deadrise hull portion, and a third starboard deadrise hull portion, each having a deadrise angle greater than 0°.

14. The watercraft hull of claim 13, wherein
   the first keel ridge portion, the first port deadrise portion, and the first starboard deadrise portion are disposed between the inner pair of first set of longitudinal elements;
   the second keel ridge portion, the second port deadrise portion, and the second starboard portion are disposed between the inner pair of second set of longitudinal elements; and
   the flattened hull portion is disposed between and directly adjacent to the inner pair of third set of longitudinal elements.

15. The watercraft hull of claim 10, wherein each longitudinal element includes a first lateral surface, a second lateral surface, and a face, the face having a 0° deadrise, the first and second lateral surfaces being substantially orthogonal to the face.

16. The watercraft hull of claim 15, further including a port sidewall and a starboard sidewall, wherein each of the first, second, and third sets of longitudinal elements include a port outermost longitudinal element and a starboard outermost longitudinal element, the port sidewall defining the first face of the port outermost longitudinal element and the starboard sidewall defining the second face of the starboard outermost longitudinal element.

17. A boat hull comprising:
 a bow, a stern, and a longitudinal centerline extending therethrough;
 a first transverse air channel and a second transverse air channel, the first and second air channels separating the hull into a bow planing portion, a middle planing portion, and a stern planing portion;
 a first plurality of longitudinal elements protruding from the bow planing portion, a second plurality of longitudinal elements protruding from the middle planing portion, and a third plurality of longitudinal elements protruding from the stern portion, wherein each of the third plurality of longitudinal elements includes a first lateral surface, a second lateral surface, and a face, the face having a 0° deadrise, the first and second lateral surfaces being substantially orthogonal to the face;
 a first port deadrise hull portion, a first starboard deadrise hull portion, a second port deadrise hull portion and a second starboard deadrise hull portion, a third port deadrise hull portion, and a third starboard deadrise hull portion, each having a deadrise angle greater that 0°;
 a V-shaped keel portion at the centerline in the bow portion having a deadrise angle greater than 0°, the V-shaped keel portion, the first port deadrise portion, and the first starboard deadrise portion being disposed between two adjacent longitudinal elements of the first plurality of longitudinal elements;
 a flattened keel portion at the centerline in the middle portion having a deadrise angle of 0°, the flattened keel portion, the second port deadrise portion, and the second starboard deadrise portion being disposed between two adjacent longitudinal elements of the second plurality of longitudinal elements; and
 a flattened hull portion at the centerline in the stern portion having a deadrise angle of 0°, the flattened hull portion being disposed between and directly adjacent to two adjacent longitudinal elements of the third plurality of longitudinal elements.

18. The boat hull of claim 17, wherein the first and second transverse air channels are each configured to be fluidly isolated from the rest of the hull when the hull moves in a forward direction in water.

19. A method of constructing a watercraft, the method comprising:
 forming a watercraft hull including:
  a longitudinal centerline;
  a first air channel transverse to the centerline and a second air channel transverse to the centerline, the first and second air channels separating the hull into a bow portion, a middle portion, and a stern portion, and the first and second air channels being in fluid communication with atmospheric air;
  a first plurality of strakes protruding from the bow portion, a second plurality of strakes protruding from the middle portion, and a third plurality of strakes protruding from the stern portion, each of the first, second, and third pluralities of strakes having a port side innermost strake and a starboard side innermost strake; and
  a V-shaped keel portion in the bow portion, a first flattened keel portion in the middle portion, and a second flattened hull portion in the stern portion, each of the first flattened hull portion and the second flattened hull portion having a deadrise of 0°, and the second flattened hull portion being directly adjacent to the port and starboard innermost strake of the third plurality of strakes, each of the third plurality of strakes including a first lateral surface, a second lateral surface, and a face, the face having a deadrise of 0° and being orthogonal to each of the first lateral surface and the second lateral surface,
 the watercraft hull being configured to create a vacuum within the first and second air channels when the watercraft hull is moving in a first direction, the vacuum drawing atmospheric air into the first and second air channels and being configured to retain a volume of atmospheric air within the first and second air channels when the watercraft hull is moving in the first direction.

20. The method of claim 19, wherein:
 the watercraft hull is configured to generate transverse pressure on at least one of the first and second lateral surface of each strake when the watercraft hull is turned in a second direction.

* * * * *